June 30, 1959 J. P. DE ROSE 2,892,483
ADJUSTABLE SEAT MOUNT
Filed Sept. 2, 1955 4 Sheets-Sheet 2
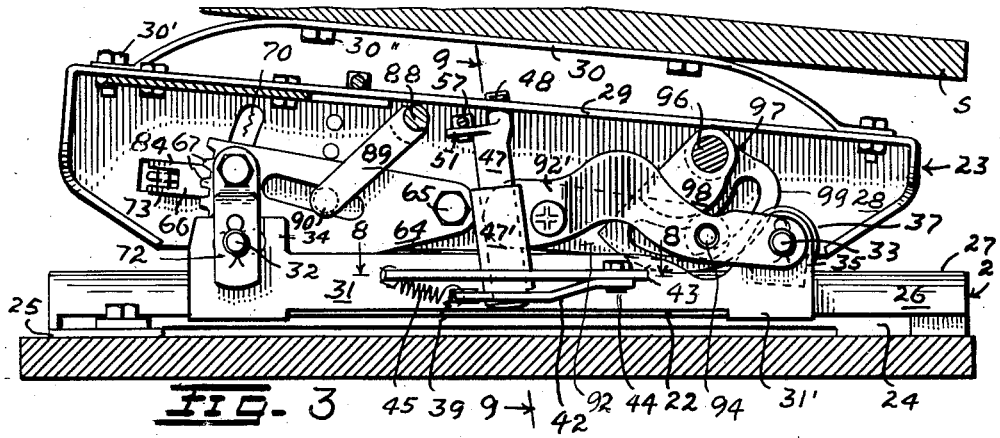
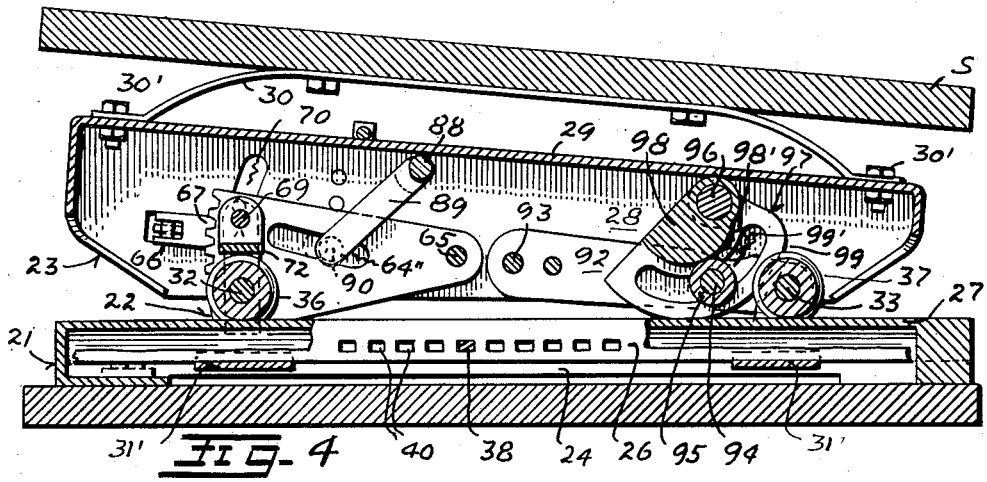
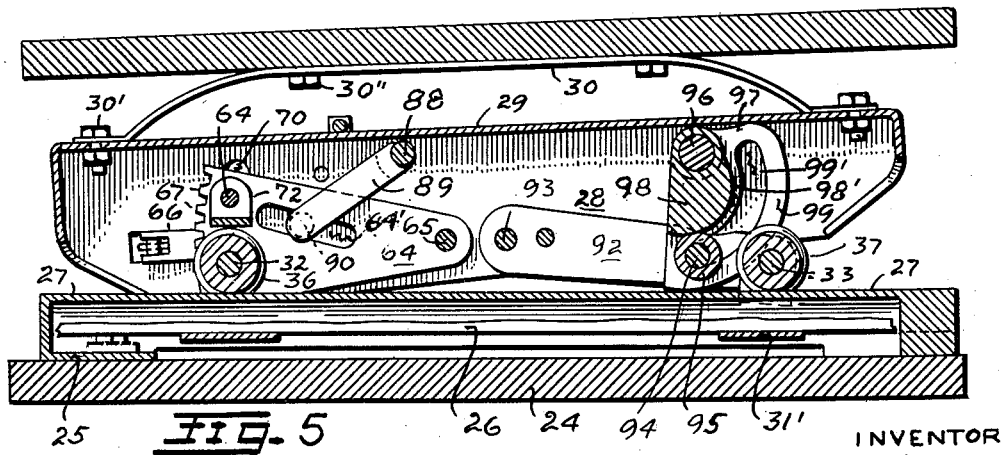
INVENTOR
JOHN P. DeROSE
BY Henry N. Young
ATTORNEY

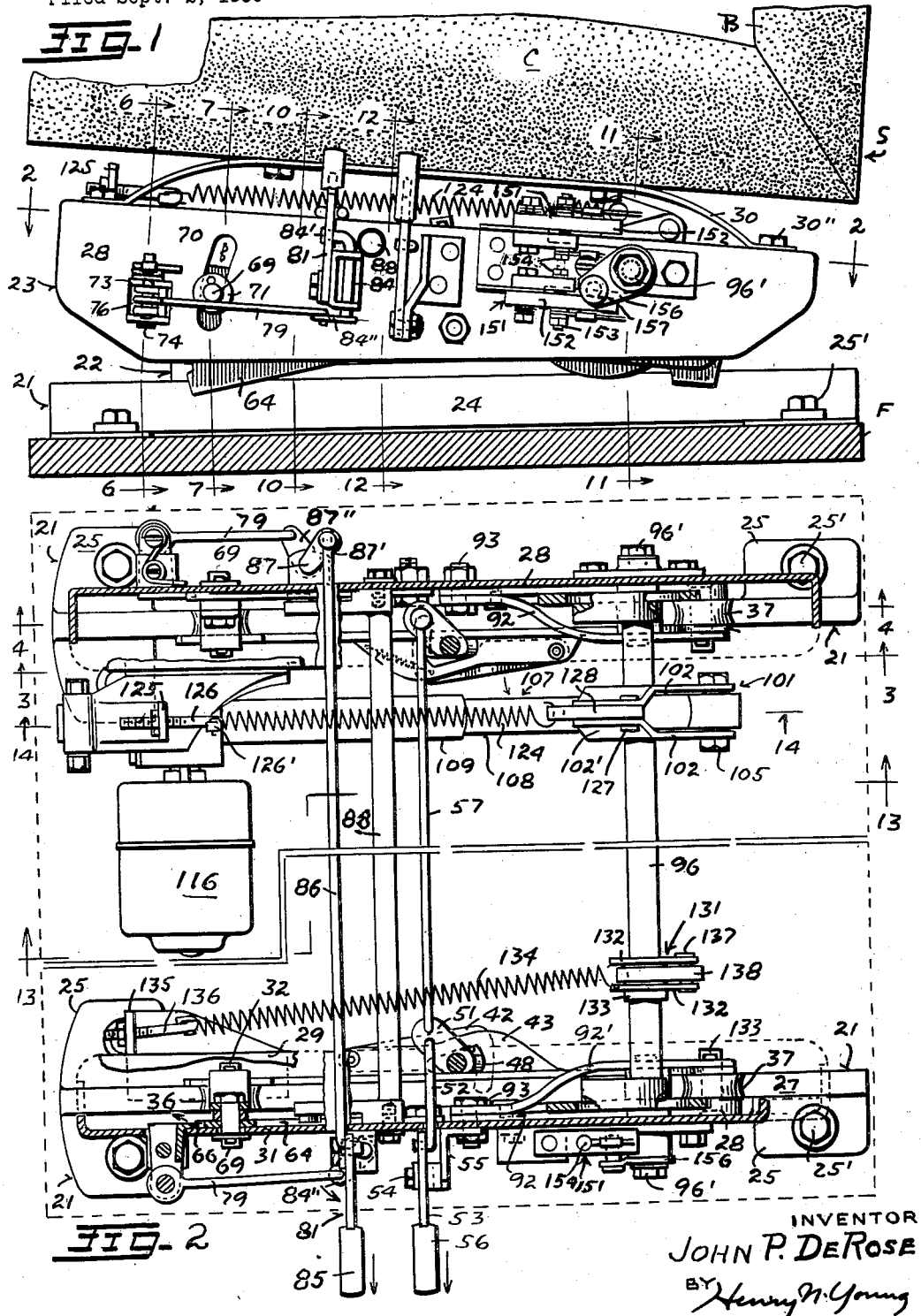

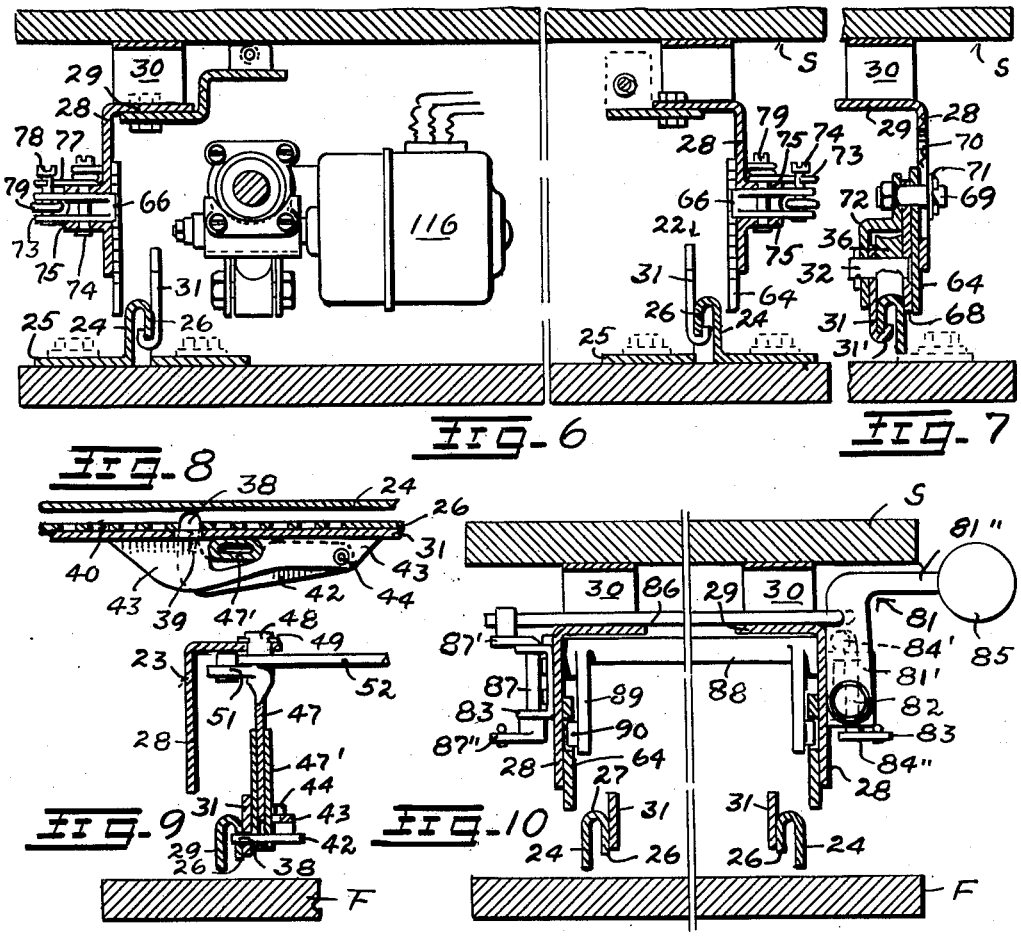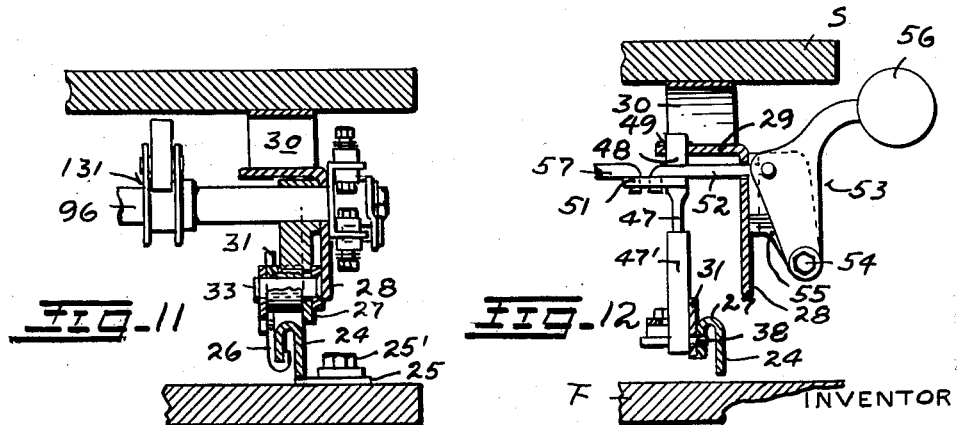

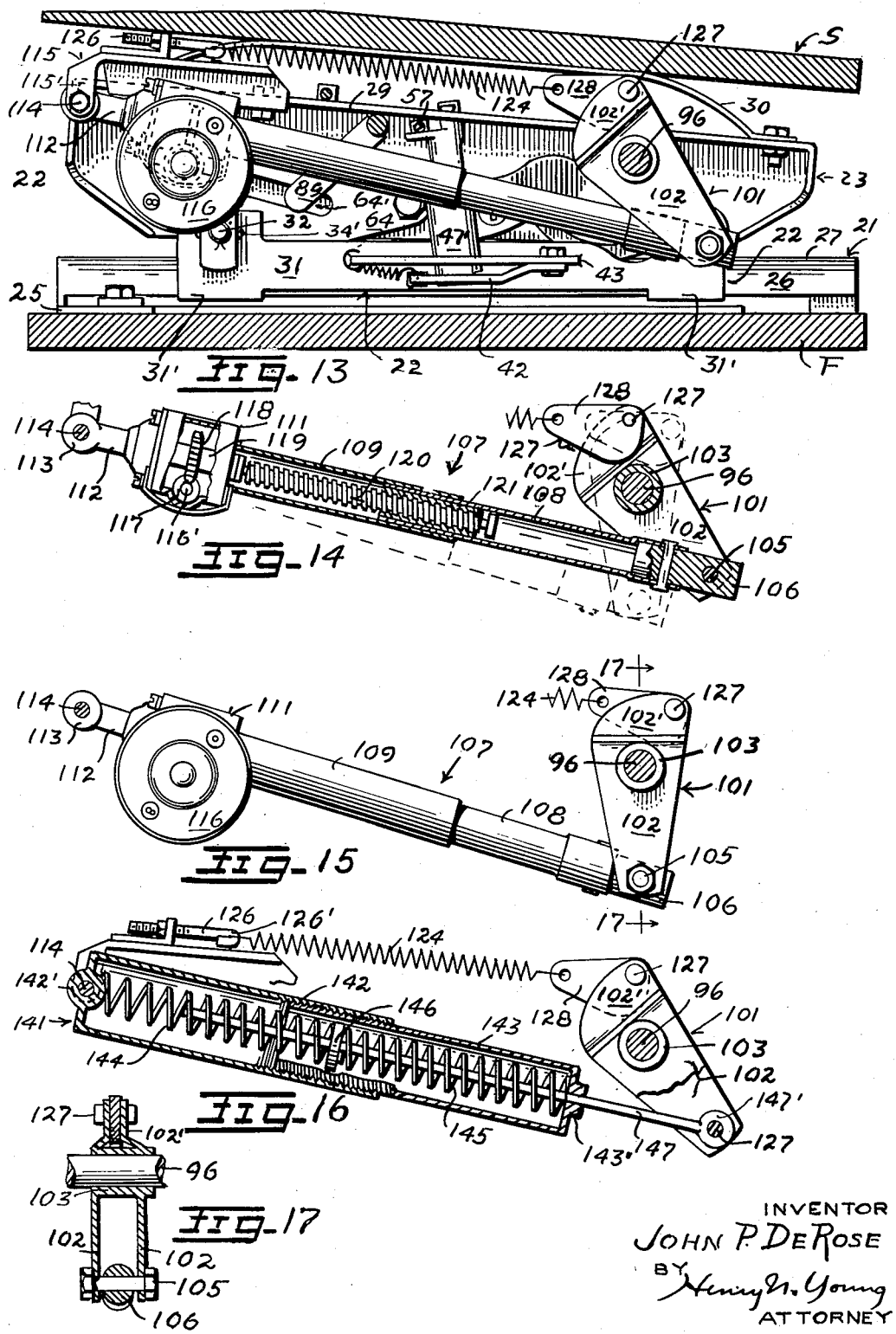

United States Patent Office 2,892,483
Patented June 30, 1959

2,892,483

ADJUSTABLE SEAT MOUNT

John P. De Rose, Clearlake Oaks, Calif.

Application September 2, 1955, Serial No. 532,188

9 Claims. (Cl. 155—14)

The invention relates to an adjustable mounting for a seat.

Recalling that the most efficient use of a seat by a seated operator of vehicular, or other, controls depends on the seat position with respect to the supporting floor and to the controls, the present features of invention concern a seat mounting which provides for mutually independent height and/or angularity and/or fore-and-aft adjustments of the seat to most comfortably fit and position physically different operators of the controls. Furthermore, adjustments of the height and angularity of a seat with respect to a supporting floor determine the comfort of a person utilizing the seat independently of any control operations, and are therefore of interest per se aside from any fore-and-aft adjustments provided for the seat.

Accordingly, a general object is to provide an improved seat mounting which permits mutually independent height and/or angularity and/or fore-and-aft adjustments of the seat with respect to its base support.

Another object is to provide improved equilized adjustments for a seat which is independently supported by complementary assemblies at its opposite sides.

A further object is to provide an adjustable seat-mounting in which a height adjustment thereof is arranged to be effected by an electric motor means.

An additional object is to provide a seat-mounting of the character described which is of a generally simple structure for its purposes.

A more specific object is to provide an adjustable seat support which is particularly adapted for use by an operator of the controls of a motor-driven vehicle.

The invention possesses other objects and features of advantage, some of which, with the foregoing, will be set forth or be apparent in the following description of typical embodiments thereof, and in the accompanying drawings, in which:

Figure 1 is a fragmentary left-side elevation of a seat-mounting structure embodying the features of the present invention and shown as supporting a seat from a floor in adjustably set position.

Figure 2 is a plan view taken generally below the section line 2—2 in Figure 1.

Figure 3 is a view of the present seat-mounting structure taken at the line 3—3 in Figure 2.

Figure 4 is a view taken at the line 4—4 in Figure 2.

Figure 5 is an elevation taken as in Figure 3, but with the seat in a different adjusted position.

Figure 6 is a sectional elevation taken at the line 6—6 in Figure 1.

Figure 7 is a sectional elevation taken beyond line 7—7 in Figure 1.

Figure 8 is a fragmentary section taken at the line 8—8 in Figure 3.

Figure 9 is a fragmentary section taken at the line 9—9 in Figure 3.

Figure 10 is a limited view taken at the line 10—10 in Figure 1 and showing only structural portions adjacent said line.

Figure 11 is a fragmentary section and view taken at the line 11—11 in Figure 1.

Figure 12 is a limited fragmentary view taken at the line 12—12 in Figure 1 and showing only structural portions adjacent said line.

Figure 13 is a sectional elevation taken at the broken line 13—13 in Figure 2.

Figure 14 is a sectional view taken at the line 14—14 in Figure 2.

Figure 15 is a side elevation of the structure shown in section in Figure 14, but with certain parts in a different angular relation.

Figure 16 is a section corresponding to Figure 14 and showing an alternative to the control means thereat.

Figure 17 is a section taken at the line 17—17 in Figure 15.

The features of present invention are shown as embodied in the structure of a seat unit S which comprises a seat having a cushion C and a back B, and mounted on the present adjustable support structure having its base resting upon a supporting surface such as that provided by a floor or common baseplate F. The present seat is of a usual upholstered type having a rigid bottom plate or frame for its direct mounting upon the present adjustable support structure, and structure having been particularly designed for its installation for the mounting of a seat in a motor-driven vehicle for use by the operator or other riders in the vehicle, though applicable to seats generally wherever its types of adjustment are advantageous. The present seat-supporting assembly generally comprises a pair of complementary base members 21 for fixing to a floor F in laterally spaced and parallel relation to extend upwardly from the floor beneath the different seat ends in fore-and-aft relation thereto, mutually complementary intermediate members 22 carried on the base members 21 for fore-and-aft adjustments therealong, and members 23 for fixing to a seat bottom adjacent its ends to depend therefrom and adjustably connected to the corresponding intermediate members 22 to complete a unitary assembly which provides for mutually independent and corresponding height adjustments of the front and rear of the seat with respect to the members.

The present base members 21 each include a flat upright plate portion 24 provided with flanges 25 extending transversely therefrom at their bottom edges to provide foot bearings by which the plates may be secured to a floor F in relatively fixed and mutually parallel relation, as by bolts 25'. Each base plate 24 provides a plate 26 in parallel spaced relation to its inner face and integrally connected to it at its top by a cylindrically rounded return bend 27 which is straight along its length and is arranged to provide and comprise a supporting track for the corresponding intermediate member 22. The seat-carrying members 23 comprise flat upright plates 28 provided with transverse edge flanges 29 which are directed inwardly of the plates and are arranged to mount relatively rigid and upwardly-arched seat-mounting bars 30 which have their ends secured to the flanges 29 by bolts 30' and are intermediately secured to the seat bottom by bolts 30''.

It will now be noted that each intermediate member 22 comprises an upright flat plate portion 31 having integral lateral extensions 31' at the ends of its bottom edge, with said extensions turned up opposite the outer face of the plate portion 31 into parallel spaced relation to the portion to provide aligned guideway troughs of like depth at the member end portions for freely receiving the bottom edge portion of a plate 26 of a base member 21 for operating to prevent a releasing lifting of the member 22 from its support on the member 21. Stub-shafts 32 and 33 are disposed through transverse openings provided through top upright front and rear extensions 34 and 35 of the plate portion 31 of the intermediate member 22, said shafts respectively mounting rollers 36 and 37 having convexedly grooved treads for complementarily receiving the support track 27 provided by the base member 21; in the present instance, the rollers 36 and 37 are of like size. For a reason to be hereinafter brought out, the shaft-receiving openings 34' of the forward extensions 34 comprise slots having their longitudinal axes parallel to the line of the trough-like extensions 31'; in the present instance, the opening for the forward shaft 32 is horizontally elongated.

Means are provided for fixing an intermediate member 22 in adjusted position along the mounting base 21, said means essentially comprising a locking pin 38 which extends through a hole 39 through the plate portion 31 of the member 22 to selectively engage one of a longitudinal line of holes 40 provided in the portion 26 of the base member 21 (see Figures 4 and 8 and 9). The holes 40 are so related to the projectible locking pin 38 that an adjustment of the member 22 is permitted for the full length of the base member 21; in the present structure, the inverted trough of the track 27 has its ends closed, whereby the end closures may function as stops against the ends of the member 22 to limit the fore-and-aft adjustment of said member to a normal range of adjustment desirable for the mounted seat. Means are preferably provided for controlling the position of the pin 38 with respect to the holes 40, said means being manually operative to inoperatively dispose the pin against spring resistance.

As particularly shown in Figures 1 and 2 and 3 and 8 and 9 and 12, the locking pin 38 extends laterally and integrally from the forward end of a flat elongated arm 42 disposed along the inner face of the portion 31 of the member 22 in perpendicular relation thereto and beneath and adjacent a flat rib or flange 43 integral with the member and extending transversely therefrom. At its rearward end, the arm 42 is attached to the flange 43 at an upright hinge pin 44, and is permitted a pin-withdrawing swinging displacement about the pin 44 against the resistance of a tension spring 45 which is normally operative between forward end points of the flange and arm to normally maintain the operative disposition of the pin 38 in a hole 40 in the plate 26 of the base 21. Notches are provided in the outer edges of the arm 42 and flange 43 just rearwardly of the locking pin 38 and opposite the plate 31, and receive therethrough an uprightly disposed elongated flat element 47 which has its lower portion complementarily engaged in a flattened sleeve element 47' which is normally disposed in flat engagement between the opposed face of the upright flat plate 31 of the member 22 and the edge of the notch in the arm 42, while constantly free of the edge of the notch in the flange 43.

At its upper end, the element 47 is provided with a terminal trunnion extension 48 which is extended through and journalled in a hole provided in the flange 29 of the upper support member 23 near its outer edge and is supported in place on the flange by a cotter key 49 engaged through it above the flange. An arm 51 extends radially of the element 47 adjacent and in approximately parallel relation to the flange 29 of the member 23 and provides a connection for an end of a pull rod 52 which extends freely through an opening in the plate 28 to a point beyond the outer face thereof. The arrangement is essentially such that a longitudinal pulling of the rod 52 is operative to sufficiently rotate the element 47 about its rotative axis provided by the trunnion 48 to operate the edges of the member 47' thereon as a cam means against the opposed faces of the plate 31 and the opposed edge of the arm notch to swing the pin-carrying end of the arm away from the flange 43 and thereby withdraw the pin from a hole 40 in the plate 24 to then permit a free fore-and-aft adjustment of the seat with respect to the base member 21.

A lever 53 is manually operable at the outer side of the upright plate 28 of the member 23 for pulling the rod 52 to effect a freeing of the locking pin 38 from a hole 40 in the plate 26 of the base member 21. As is particularly brought out in Figures 1 and 3 and 12, the lever 53 extends upwardly from a fulcrum pin 54 at its lower end, with said pin mounted on a bracket member 55 extending transversely outwardly from the plate 28 and fixed to the latter in such a position that the pull rod 52 may be hingedly fixed to an intermediate point of the lever by reason of the engagement of a radial end extension thereof through a bearing opening in the lever. The lever portion above its connection with the pull rod 52 extends transversely outwardly of the plane of the mounting plate 28 and carries a suitable handle knob 56 within convenient reach of an occupant of the adjacent seat end for pushing generally outwardly and downwardly to pull the rod 52 to release the intermediate support member 22 for its free fore-and-aft adjustment along the tracks 27 by the occupant of the seat.

Means are provided for withdrawing the locking pin 38 provided by the complementary support assembly at the right side of the supported seat whenever the corresponding pin of the left-side assembly is withdrawn. As is indicated in Figures 2 and 3 and 12, a pull rod 57 connects the end of the arm 51 at the left-side pin-releasing assembly with the arm 51 of the corresponding right-side assembly, the arms respectively extending rearwardly and forwardly of the trunnions 48 for producing like actuations of the different pin-displacing elements 47. In this manner, a pin-releasing operation of the lever 53 simultaneously releases the intermediate members 22 at both seat sides to provide for corresponding fore-and-aft shifts of both ends of the mounted seat, it being understood that shifting adjustments of the seat ends are equalized by reason of the spacing of the support roller pairs along the supporting tracks 27 provided by the base member 21.

By particular reference to Figures 3 to 7 inclusive, it will now be noted that the means for adjustably supporting the front ends of the upper members 23 from the intermediate members 22 essentially comprises elongated and similar linking elements 64 which are pivoted at one end to the upright plates 28 of the upper members 23 for swinging adjustment in their planes along the opposed inner plate faces and about fixed hinge pins 65 located centrally of said flanges. With reference to a supported seat, the support links 64 extend forwardly from their hinge pins 65, have their forward ends variably engageable by catch dogs 66 mounted on the plates 28, and also receive therethrough the shafts 32 which carry the rollers 36. As is particularly brought out in Figures 3 and 4 and 5 and 7, each present intermediate support member 64 is generally sector-shaped, with its hinge pin 65 engaged transversely through its apical end and its arcuate end edge transversely and uniformly notched therealong to provide a curved line of teeth 67 arranged for their selective engagement by the cooperative dog 66 which is shown as providing a pair of teeth for receiving a tooth 67 between them. Since the support of the upper members 23 from the intermediate members 22 is independent of any provision for the described fore-and-aft adjustment of the latter members, the members 22 are understood to comprise base members with respect to the supported seat and may be so referred to.

As is particularly brought out in Figures 1 to 5 inclusive and 7, the shaft 32 for the roller 36 extends rigidly from a plate member 68 which is fixed in upright position against the inner side of the member 64 as a part thereof, and the members 64 and 68 receive therethrough above the roller a headed pin 69 which extends outwardly through an arcuate slot 70 provided in the plate 28, with said slot having its center of curvature at the axis of the hinge pin 65 for the member 64. Outwardly of the plate 28, the pin 69 mounts a washer 71 spanning the slot 70 and retained in place in opposition to the plate 28 by a cotter key engaged through the extending pin and thereat. The other end of the pin 69 extends through the upper end portion of a generally upright member 72 having a lower end portion offset inwardly of the plate 31 and the roller 36 and receiving the inner end of the roller shaft 32 therethrough and being secured in place on the shaft by a cotter key through the inner shaft end. Understanding that the roller shaft 32 is laterally and solely guidedly movable in the slot-shaped horizontal opening 34' of the front extension 34 of the plate portion 31 of the members 22, it will be noted that the roller-carrying shaft 32 and its roller 36 are mounted, in effect, on the member 64 which adjustably carries the front end of the overlying member 23 upon it.

By reference to Figures 1 and 2 and 6, it will be seen that each dog 66 is provided at the inner end of a member 73 which is L-shaped in plan and is mounted on an upright pivot pin 74 carried by and between ears 75 struck out outwardly from the plate portion 28 to provide an opening 76 through which the member 73 extends for its rocking about the pin 74 for engaging and disengaging movements of the dog 66 transversely of the plane of the member 64. An upwardly extending portion of the pivot pin 74 mounts a helical torsion spring 77 having one end appropriately anchored against the plate 28. The arm of the member 73 which extends outwardly from the pivot pin 74 mounts an upright pin 78 which engages a terminal eye provided by a pull link 79, an upwardly extending portion of said latter pin anchoring the other end of the torsion spring 77. The present arrangement is essentially such that the dog 66 is constantly urged to maintain its cooperative engagement with an opposed tooth 67 of the plate member 68, whereby the forward end of the support member 23 may be releasably and adjustably held at different heights with respect to the intermediate support member 22.

A hand lever 81 is operable at the outer side of the upright plate 28 of the right side member 22 for pulling the link 79 to effect a freezing of the associated dog 66 from its engagement with a tooth of the member 64. As is particularly brought out in Figures 1 and 2 and 10, a portion 81' of the lever 81 extends upwardly from a fulcrum pin 82 at its lower end, with said pin mounted on a bracket member 83 extending transversely outwardly from the plate 28. Spaced upper and lower ears of the bracket 83 intermediately journal an element 84 which is provided at its opposite ends above an below the ears with radially directed arms 84' and 84" respectively. The upper arm 84' of the element 84 freely engages an opening in an upright portion 81' of the hand lever 81, while the lower arm 84" is connected to the pull link 79 at a down-turned terminal portion thereof engaging a hole in the arm, it being understood that the element 84 functions to provide a bell-crank lever shaft connection between the link 79 and the hand lever 81. The lever portion 81" above its connection with the element 84 extends transversely outwardly of the plane of the mounting plate 28 and mounts a suitable hand knob 85 adjacent the knob 56 of the lever 53 for inoperatively disposing the dog 66 through the action of the described link-and-lever connections, whereby to release the front portion of the support member 23 for an up-and-down adjustment of the front part of a supported seat.

Means are provided for withdrawing the dog 66 provided by the complementary support assembly at the right side of a supported seat whenever the corresponding dog 66 of the left side assembly is withdrawn. As is indicated in Figures 2 and 10, a pull rod 86 connects the lower lever portion 81" of the left-side dog-releasing assembly with the upper arm 87' of a bell-crank shaft element 87 mounted on a bracket 83 provided on the right side of the member 23, the arms 87' and 87" respectively of the element extending rearwardly and forwardly of the different trunnions 48 for producing like actuations of the different dog-releasing links 79. In this manner, a dog-releasing operation of the hand lever 81 simultaneously releases the dogs 66 at both seat sides to provide for corresponding raising or lowering adjustments of both ends of the mounted seat.

Since corresponding height adjustments of both sides of the supported seat are preferably equal and between mutually parallel positions for the front line of the seat, means are provided for substantially equalizing such adjustments. As particularly illustrated, a rock-shaft 88 is journalled in and between the plates 28 of the support members 23 at corresponding upper points thereof beneath their flanges 29. Crank arms 89 extend radially from the shaft 88 in fixed relation to the shaft and opposite the inner sides of the plates 28, and the outer ends of the arms 89 carry mutually aligned crank pins 90 which extend away from each other and into opposed guideways 64' provided in the members 64. As particularly illustrated, the guideways 64' comprise corresponding straight slots through the members 64 having their longitudinal lines passing below the hinge pins 65 of the members at a distance from the axis of the shaft 88 which is always less than the effective crank arm radius, whereby the crank pins must follow both slots to then correspondingly dispose the members 64 as the seat front is raised or lowered.

By particular reference to Figures 2 to 5 inclusive and 11, it will be noted that the shaft 33 for each rear support roller 37 is carried by and between the rear ear 35 of the plate 31 of the intermediate member 22 and an elongated plate member 92 which fixedly carries the roller shaft 33 as an inwardly directed stub shaft and extends forwardly to a connection with the plate 28 of the member 23 at a fixedly positioned hinge pin 93 comprising a bolt which rockably receives the member 92 between its head and the inner face of the plate 28. Slightly forwardly of the roller shaft 33, the member 92 carries a stub shaft 94 mounting a roller 95 which is constantly free of the track 27. An elongated member 92' is unitarily fixed to and against the member 92 adjacent its hinge pin 93, and is transversely offset opposite the rear portion of the member 92 to extend opposite the inner side of the rear extension 35 of the plate 31, said member 92' providing an opening freely receiving the inner end of the hinge pin 93, and another opening receiving the roller shaft 33 between the ear and a cotter key engaged through the shaft; the member 92' functions primarily to retain the roller 95 on the stub shaft 94 about which it revolves in the plane of action of the roller 37.

The height of the rear portion of the seat is changeable by appropriate rotary adjustments of a rock-shaft 96 extending through and between aligned bearings provided in the upright plate portions 28 of the upper seat-support members 23; screws 96' engaged axially in the shaft ends have their heads extending opposite the outer ends of said bearings for maintaining the shaft 96 in mounted relation to and between the seat-carrying plates 28. As is brought out in the drawings, actuating members 97 are fixedly mounted on the shaft 96 for direct coaction with the different rollers 95 in such a manner that an appropriate rocking of the shaft 96 is arranged to raise or lower the rear edge of the supported seat by reason of the direct coaction of edge-cam portions 98 of the members 97 with said rollers; the cams 98 present spiral roller-engaging faces 98', and each actuating member 97 is further provided with a flange 99 extending radially beyond its cam edge between the cam and the member 92, and provided with a slot 99' having its side edges complementary to the cam edge face 98' for closely and slidably receiving the stub shaft 94 which carries the engaged roller 95.

By particular reference to Figures 3 and 4, it will now be noted that intermediate height adjustments are indicated for both the front and back of the supported seat; in these showings, the front right-side sector member 64 is intermediately engaged by the dog 66, while the roller 95 is intermediately engaged by the cam face 98' of the corresponding cam 98. Figure 5, on the other hand, shows a relation in which the seat front is lowered to its limit, while the rear of the seat is raised to its limit, it being noted that the roller 95 constantly underlies the rock-shaft 96 in all adjusted positions for the actuating member 97, and that the roller-carrying member 92 provides an angularly variable linking connection between the intermediate and upper support members 22 and 23 during any height adjustment of the front or rear of the seat; because of this required movement of the member 92 during seat adjustments, it will now be understood why the bearing opening 34' for the shaft 32 of the forward support roller 36 comprises a slot.

A rocking of the shaft 96 for effecting a height adjustment at the rear of the seat is under control of a member 101 fixed on the shaft 96 at a point thereof between the described support assemblies. As is particularly brought out in Figures 13 to 15 inclusive, the member 101 comprises spaced side plates 102 connected at a common hub 103 and providing opposed and complementary lever arm portions carrying between their extremities a pivot bolt 105 arranged for engagement by a link means for settably rocking the lever through the range of adjustment permitted by the engagement of the stub shaft 94 in the slot 99' of the member 97. As is particularly brought out in Figure 14, the pivot bolt 105 is engaged through a bearing block 106 provided at the rearward end of a link assembly 107 of adjustable length and comprising a tubular section 108 fixed to the block 106 and telescopically engaged in a tubular section 109 to a controlled adjusted degree as the means for disposing and holding the rock-shaft 96 in set adjusted position.

As particularly illustrated, the link section 109 extends rigidly from one side of a gear housing 111 having an element 112 extending rigidly from its opposite side in coaxial alignment with the link section 109. At its outer end, the element 112 provides an eye 113 which receives a hinge pin 114 extending from a down-turned arm 115' of a bracket member 115 which is fixed to and beneath the flange 29 of the adjacent plate member 28, whereby the link assembly 107 is constantly supported by and between the pivot bolt 105 of the member 101 and the hinge pin 114, the axes of said bolt and pin being mutually parallel and the link assembly extending perpendicularly to the said axes. In the present arrangement, the control member 101 and gear housing 111 are disposed opposite and relatively close to the inner side of the right-side upper support member 23, and the gear housing mounts an electric motor 116 extending inwardly from the housing in perpendicular relation to the plane of the plate 28 of the member 23.

By particular reference to Figures 2 and 13 and 14, it will now be noted that the motor shaft 116' mounts a worm 117 which constantly meshes with a worm gear 118 mounted on a shaft 119 which is suitably journalled in the gear housing 111 longitudinally thereof and in the coaxial line of the link sections 108 and 109. A screw 120 extends fixedly from the rearward end of the shaft 119 to a threaded connection with a tubular nut member 121 fixed within the outer end portion of the link section 108, whereby a turning of the screw 120 by an actuation of the motor 116 may cause an effective lengthening or shortening of the link assembly 107 to adjustably rock the member 101 on the rock-shaft 96, it being understood that the threaded engagement of the screw 120 with the nut 121 locks the assembly against its length adjustment except by motor actuation of the screw, and that the motor is reversedly operable under control of a three-way switch (not shown) which may be conveniently mounted on the outer side of the member 23 at an accessible point thereof, or elsewhere within convenient reach of an occupant of the seat.

Means are preferably provided for constantly urging a rotation of the rock-shaft 96 to raise the rear of the seat S to its upper limit, said means essentially comprising one or more helical springs 124 which are operative in tension between anchorages provided at forward points of the upper support members 23 and at lever arms provided on the shaft 96; as particularly shown, the motor-support bracket 115 is provided with an upstanding ear 125 which provides an opening through which the shank of a J-bolt 126 extends with its hook end 126' directed rearwardly for engagement by the forward end hook or loop of the tension spring 124 thereat. A nut mounted on the threaded shank portion of the J-bolt 126 forwardly of the ear 125 provides for an adjusted disposal of the hook end 126' of the bolt with respect to the ear 125, whereby to permit an adjustment of the tension in the spring. The rear anchorage for the spring 124 is shown as provided from a pin 127 carried by and between opposed upward extensions 102' of the side plates 102 of the shaft-carried control member 101, said extensions being mutually offset toward each other to receive between them a relatively thin flat link member 128 having one link end receiving the pin 127 transversely therethrough while its other end provides an eye which receives the rearward end hook or loop of the tension spring 124 therethrough.

Noting that the spring-anchor pin 127 of the shaft-control member 101 swings through an arc above the shaft 96 as the rear of the seat is moved between its limiting raised (Figure 15) and lowered positions under control of the shaft, means are preferably provided whereby the effective lever arm for the tension spring 124 does not change appreciably as the seat rear is raised above the lowermost position determined for it when the pin 127 lies rearwardly of the shaft in a substantially horizontal plane through the shaft. As particularly shown, the connecting link 128 is laterally widened below its longitudinal line to provide a curved under edge 129 which is arranged to engage the hub 103 of the member 101 while the pin 127 is swung upwardly to and beyond an upright plane through the shaft 96 during a seat-raising actuation of the shaft, whereby to provide more uniform action for the spring 124 than would otherwise be provided.

Understanding that the motor-actuated control member 101 may be disposed adjacent either side of the present seat support assembly, a tension spring 134 is provided for functioning as the spring 124 at the other (left) seat side. As particularly shown, a member 131 is mounted on the shaft 96 adjacent the left-side seat-engaging support member 23, with said member having the same general structure as the control member 101, except that it lacks the depending lever arms of the member 101. The member 131 has spaced opposed side plates 132 extending rigidly from a hub 133, and said plates terminally mount an anchor pin 137 at which the spring 134 may be attached through a link 138 functioning as the link member 128 which is provided by the member 101. The other end of the tension spring 134 is connected to an attaching ear 135 provided on the member 23 through an adjustable J-bolt 136 as for the spring 124. By the provision and use of the adjustable tension springs 124 and 134, the rockshaft 96 is constantly urged to an equalized counterbalance seat-raising rotation thereof, independently of the positive positioning action of the longitudinally adjustable link assembly 107.

Referring generally to the mutually independent fore-and-aft and front-height and rear-height adjustments provided for a seat mounted on the unitary support now described, it will be noted that fore-and-aft adjustments are arranged to be effected by an occupant of the seat making appropriate fore-and-aft body movements under the control of his feet on the floor while the locking pins 38 are held withdrawn by an appropriate actuation of the hand lever 53. Height adjustments for the front of the seat may be readily made by a person sitting on the seat and rocking backwardly or forwardly to dispose the front edge of the seat at a desired height while the locking dogs 66 are held disengaged from the teeth 67 of the support members 64 by an appropriate rocking of the hand lever 81. While the foregoing types of seat adjustments may be made without undue difficulty, experience has shown that rear height adjustments of a seat which has been released at its rear are generally awkward and difficult to make, whereby the present power control for the positioning of the rear of a seat is particularly valuable, it being understood that the present seat support assembly provides for complete ranges of fore-and-aft and height and angle adjustments for a supported seat.

It will now be noted that, if such is desired, the seat S may be solely spring-supported at its rear by omitting the described motor control and depending on the action of the tension springs 124 and 134 as the sole support for the rear of a seat which would then swing about the support axis provided by the forward support rollers 36 under the weight of the person or persons occupying the seat. Since, however, the weight of the person or persons on the seat would then determine the angularity of the seat with the springs 124 and 134 set only to resist a depression of the rear of the seat, the motor-controlled link assembly 107 of adjustable length might be advantageously replaced by a spring assembly of the double-acting shock-absorbing type whereby undue up-and-down swinging movements of the seat may be prevented. As particularly shown in Figure 16, a longitudinally yielding shock-absorbing link assembly 141 of adjustable length connects the pivot pin 114 provided by the right-side upper member 23 and the anchor pin 127 of the member 101 on the rock shaft 96, whereby to provide a rear seat support which is resilient in addition to any resiliency incorporated in the seat cushion.

As is illustrated in Figure 16, the link assembly 141 comprises tubular members 142 and 143 having closed ends 142' and 143' respectively, and having their other ends open and telescopically engaged in mutually threaded engagement thereat. The end 142' of the member 142 is formed to provide a bearing bore for rotatably mounting it on the hinge pin 114 provided by the bracket 115. Helical compression springs 144 and 145 extend toward each other from the respective ends 142' and 143' of the members 142 and 143 to contact the opposite sides of a seat-disc 146 provided on a push-and-pull rod 147 mounting the disc 146 and extending through the bore of the member head 143' to a terminal eye 147' of the rod which receives the pivot bolt 105 of the actuator 101. It will be understood that the shock-absorbing unit 141 thus constituted, and operatively engaged between the pins 105 and 114, is adjustable as to its effect by varying the degree of the threaded engagement of the members 142 and 143, the latter of which is shown as having its open end threadedly engaged within the open end of the member 142. When a present shock-absorbing link assembly 141 is utilized, the static disposal of the disc 146 is determined by the relative adjustment of the members in general accordance with the seat load which is resiliently supported by the present arrangement.

As is indicated in Figures 1 and 2, similar limit switches 151 are provided on the outer face of the plate 28 of the left-side member 23 for stopping the operation of the motor 116 by opening the energizing circuit for the motor as the rear portion of the seat reaches its limiting raised or lowered positions. In general terms, spring-loaded switch arms 152 provide contacts which are normally engaged with fixed contacts connected with a common conductor of the power circuit for the reversible motor 116, while the contacts of the different movable switch arms 152 are connectable through a suitable selector switch (not shown) with conductors of the motor circuit branches to provide energy for effecting mutually opposite rotations of the energized motor. The contacts of the switch arms 152 which normally engage the opposed fixed contacts of the switches 151 are alternately disengaged from said contacts in accordance with the rotative setting of the seat-positioning rock-shaft 96, as by the action against the switch arms 152 of a roller 157 carried by an arm 156 fixed on the extending left end of the seat-positioning shaft 96. The arrangement is essentially such that when the shaft has been rocked to either limiting position therefor, only that selector-controlled circuit which may energize the motor for rocking the shaft toward its other limiting position is closed at the appropriate limit switch 151.

While I have particularly shown the height control provided by the shaft 96 and the electric motor 116 as comprising a preferred arrangement for effecting height adjustments at the rear of a mounted seat, it will be understood that this operative combination might be utilized at the front of the seat in lieu of the disclosed device, while the same or a different height adjustment means is utilized at the rear of the seat.

From the foregoing description taken in connection with the accompanying drawings, the advantages of the present adjustable seat mount will be readily understood by those skilled in the art to which the invention appertains. While I have shown and described arrangements which I now consider to be preferred embodiments of my invention, I desire to have it understood that the showings are primarily illustrative, and that such changes and developments may be made, when desired, as fall within the scope of the following claims.

I claim:

1. In combination with a seat, an adjustable seat support comprising a base member disposed beneath the seat and providing a fore-and-aft support track, an upper member depending from the seat in fixed mounting relation thereto, an intermediate member constantly supported on forward and rear roller means engaging the track of said base member for solely rectilinear fore-and-aft adjustment therealong, a bolt means correspondingly and directly cooperative between the base member and the intermediate member to releasably secure the intermediate member in different adjusted fore-and-aft relations to the base member, means carried by the upper member manually actuatable for rendering said bolt means temporarily inoperable to then permit the fore-and-aft adjustment of the seat and with respect to the base member, elongated members hingedly linking forward and rear said rollers to intermediate points of said upper members, and means directly cooperative between the different linking members and the said upper members independently operable to effect height adjustments of the ends of the upper member.

2. In combination with a seat, an adjustable seat support comprising a fixedly disposed elongated base member positioned beneath the seat in fore-and-aft relation thereto, an upper member depending from the seat above the base member in fixed mounting relation to the seat, an elongated member hingedly linking an end point of the base member to an intermediate point of the upper member to permit relative upright spacial adjustments of the connected members thereat, a cam-plate member providing a cam edge, means mounting said plate member on the upper member for its adjusted rotation about a fixed axis transverse to the member while the cam edge is constantly engaged by said linking member for the adjusted support of the upper member from said linking member, and means for rotatively adjusting said cam member about its axis of rotation whereby said upper member may be disposed and held in adjusted height relation to the base member.

3. In combination with a seat, an adjustable seat support comprising a fixedly disposed elongated base member positioned beneath the seat in fore-and-aft relation thereto, an upper member overlying the base member and depending from the seat in fixed mounting relation to the seat, an elongated member hingedly linking an end point of the base member to an intermediate point of the upper member to permit relative spacial upright adjustments of the members thereat, a shaft journaled in said upper member for rotation about an axis parallel to the support plane of the base member and transverse to the longitudinal line of the member and fixedly mounting a radial actuating arm, a cam plate fixedly mounted on said shaft and having an arcute slot providing a cam edge eccentric to the shaft axis, a member projecting fixedly from said linking member and guidedly engaged in said slot in contact with said cam edge of the slot for supporting the upper member from the base member, and means coactive between the upper member and the shaft arm for rotatably adjusting and setting the shaft for the disposition and retention of the upper member in adjusted height relation to the base member.

4. A structure in accordance with claim 3 wherein the last means comprises a linkage of adjustable length, and means are provided for varying the effective length of said linkage.

5. In combination with a seat, an adjustable seat support comprising laterally spaced elongated base members positioned beneath the seat in fore-and-aft relation thereto, upper members depending from the seat above said base members in fixed mounting relation to the seat, elongated members hingedly linking forward and rear end points of the base members to intermediate points of the corresponding upper members and providing for independent height adjustments of forward and rear portions of the upper members with respect to the underlying base members above said end points of the base, a rock shaft journaled in and between said upper members for its rocking about an axis parallel to the front edge of the seat and provided with a radial positioning arm, cam means on said shaft cooperative with corresponding said linking members for supporting the seat at different adjusted heights above the base members in accordance with the rotatively adjusted positionings of the shaft, and a linkage of variable effective length having laterally engaged sections arranged for their relative adjustment longitudinally thereof constantly cooperative between one said upper member and the shaft arm for disposing the shaft in rotatively adjusted position.

6. A structure in accordance with claim 5 provided with an electric power means for adjusting the length of the linkage.

7. A structure in accordance with claim 5 wherein the linkage has threadedly engaged sections and a power means is provided on an upper member for relatively rotating the linkage sections to adjust the linkage length.

8. In combination with a seat, an adjustable seat support comprising laterally spaced elongated base members fixedly positioned beneath the seat in fore-and-aft relation thereto, upper members depending from the seat above the base members in fixed mounting relation to the seat, elongated connecting members comprising upright plates linking end points of the base members with corresponding intermediate points of the upper members in hinged relation to the members to permit relative spatial adjustments of the base and upper members thereat and provided with corresponding transverse slots, upright lines of teeth provided by said connecting members adjacent said end points, locking dogs provided on said upper members and each normally engaged with teeth of the corresponding connecting members for supporting the seat portion above said points of the base members in adjusted spatial relation to the base members, and a rock-shaft journaled in and between the upper members and provided with mutually coplanar radial arms extending opposite the connecting members and provided with pins directed axially of the shaft and engaging the slots of the connecting members, said slots being oblique to said shaft arms and acting through the rock-shaft to provide solely like swinging adjustments of the connecting members.

9. In combination with a seat, an adjustable support comprising a base member underlying the seat, an upper member depending fixedly from and beneath the seat bottom, a member disposed in fore-and aft relation to the seat and hingedly linking an end point of the base member to an intermediate point of the upper member to permit relative upright spacial adjustments of the connected members thereat, a cam-plate member providing a cam edge, means mounting said cam-plate member on the upper member for its adjusted rotation about a fixed axis parallel to the seat bottom and transverse to the axis of the linking member while the cam edge is constantly engaged by said linking member for the adjusted support of the upper member from said linking member, and means for rotatively adjusting said cam member about its axis of rotation whereby said upper member may be disposed and held in adjusted height relative to the base member.

References Cited in the file of this patent

UNITED STATES PATENTS

| 1,838,303 | Fairchild | Dec. 29, 1931 |
| 2,594,882 | De Rose | Apr. 29, 1952 |
| 2,596,033 | King | May 6, 1952 |
| 2,669,284 | Pall et al. | Feb. 16, 1954 |
| 2,712,346 | Sprinkle | July 5, 1955 |
| 2,795,267 | Williams | June 11, 1957 |

FOREIGN PATENTS

| 593,544 | Great Britain | Oct. 20, 1947 |